United States Patent [19]
Melone

[11] 3,895,235
[45] July 15, 1975

[54] LIQUID LEVEL AND SPECIFIC GRAVITY INDICATOR

[75] Inventor: Robert Richard Melone, Des Plaines, Ill.

[73] Assignee: Illinois Tool Works Inc., Chicago, Ill.

[22] Filed: Mar. 18, 1974

[21] Appl. No.: 452,297

[52] U.S. Cl. .................. 250/577; 250/227; 73/308
[51] Int. Cl.² ......................................... G01N 21/26
[58] Field of Search .......... 250/227, 229, 573, 577; 73/313, 293, 308; 356/181, 246

[56] References Cited
UNITED STATES PATENTS

| | | | |
|---|---|---|---|
| 2,415,436 | 2/1947 | Maris | 250/231 X |
| 3,141,094 | 7/1964 | Strickler | 73/293 X |
| 3,436,727 | 4/1969 | Pagano, Sr. | 73/313 X |
| 3,545,864 | 12/1970 | Dibbern | 356/246 X |
| 3,553,666 | 1/1971 | Melone | 73/293 X |
| 3,635,678 | 1/1972 | Seitz | 250/573 X |
| 3,693,445 | 9/1972 | Johnson | 73/313 X |
| 3,699,560 | 10/1972 | Meunier et al. | 250/573 X |
| 3,777,574 | 12/1973 | Brown et al. | 250/227 X |
| 3,819,278 | 6/1974 | Muller | 356/208 |

Primary Examiner—Walter Stolwein
Attorney, Agent, or Firm—Robert W. Beart; Glenn W. Bowen

[57] ABSTRACT

A liquid level and specific gravity indicator which is capable of providing signals to a remote location is disclosed. The indicator has an upper section that contains a light source and a light sensor and a lower section which extends into the container being monitored. The lower section has a pair of light pipes each of which leads to a deflecting prism. Light rays from the light source pass along one of the light pipes, is reflected from one prism to the other and is passed along the second light pipe to the light sensor when the level and the specific gravity of the liquid is satisfactory. A floating ball contained in a channel acts as a shutter to block the light between the prisms when the liquid level or the specific gravity of the liquid is low. One or more porous filters over exterior openings in the ball channel preclude gas bubbles that could otherwise cause erroneous signals.

8 Claims, 2 Drawing Figures

LIQUID LEVEL AND SPECIFIC GRAVITY INDICATOR

BACKGROUND OF THE INVENTION

Liquid level and specific gravity indicators for storage batteries and other liquid containers which must be directly viewed by the person and which require lifting the hood of an automobile, or otherwise obtaining access to the container, are known. In the operation of an automobile, for example, it is desirable for the operator to be able to continuously monitor the condition of the battery while driving. The present invention provides a liquid indicator which may be inserted into the fill opening of a conventional storage battery and will then continuously provide electrical signals that indicate the condition and level of the electrolyte of the battery to an indicating unit that is viewable by the operator.

In the operation of the above mentioned liquid level and hydrometer it has been discovered that gas bubbles occasionally form, which may interfere with the operation of the indicator due to the displacement they can cause to a floating ball that is used as a light shutter in the device. It has been found that by positioning a porous filter material across the outside of a channel which contains the ball, the gas bubbles that are emitted from the storage battery cannot enter the channel, thereby preventing their interference with the float ball.

It is, therefore, an object of the present invention to provide a combined liquid level indicator and hydrometer which has a lower section that is inserted into a fill opening of a conventional automotive storage battery and an upper section that remains outside of the battery and contains a light source and a light sensor which have electrical connections that lead to a remote location.

It is a further object of the present invention to provide a combined hydrometer and liquid level indicator which consists of a pair of elongated light pipes one of which receives light from a light source, and the other of which is disposed below a light sensor so that the opposite ends of the light pipes are in light communication with the inclined faces of reflecting prisms and a floating shutter member is contained in a channel between the light reflecting prisms so as it varies its position in the channel light will either pass from one prism to the other or will be blocked off in accordance with the level and the specific gravity of the liquid being monitored.

It is an additional object of the present invention to provide a liquid level and hydrometer indicator which consists of a pair of light pipes which have a channel located between them that contains a float member, a light source located adjacent the upper end of one of the light pipes, a light sensor located adjacent the upper end of the other light pipe, and a pair of reflecting prisms located beneath the lower end of each of the light pipes so that light may be passed down one light pipe, reflected across the prisms and up the other light pipe to the light sensor when nothing is interposed between the prisms, wherein the float member may block off the light between the prisms in accordance with its position and a porous filter is inserted across at least a portion of the channel that is open so as to preclude gas bubbles that otherwise would interfere with the operation of the indicator.

Other objects and advantages of the present invention will be apparent to those skilled in the art from the following specification and accompanying drawings.

DESCRIPTION OF THE DRAWINGS

The present invention is illustrated in the accompanying drawings in which.

TECHNICAL DESCRIPTION OF THE INVENTION

Figure 1:
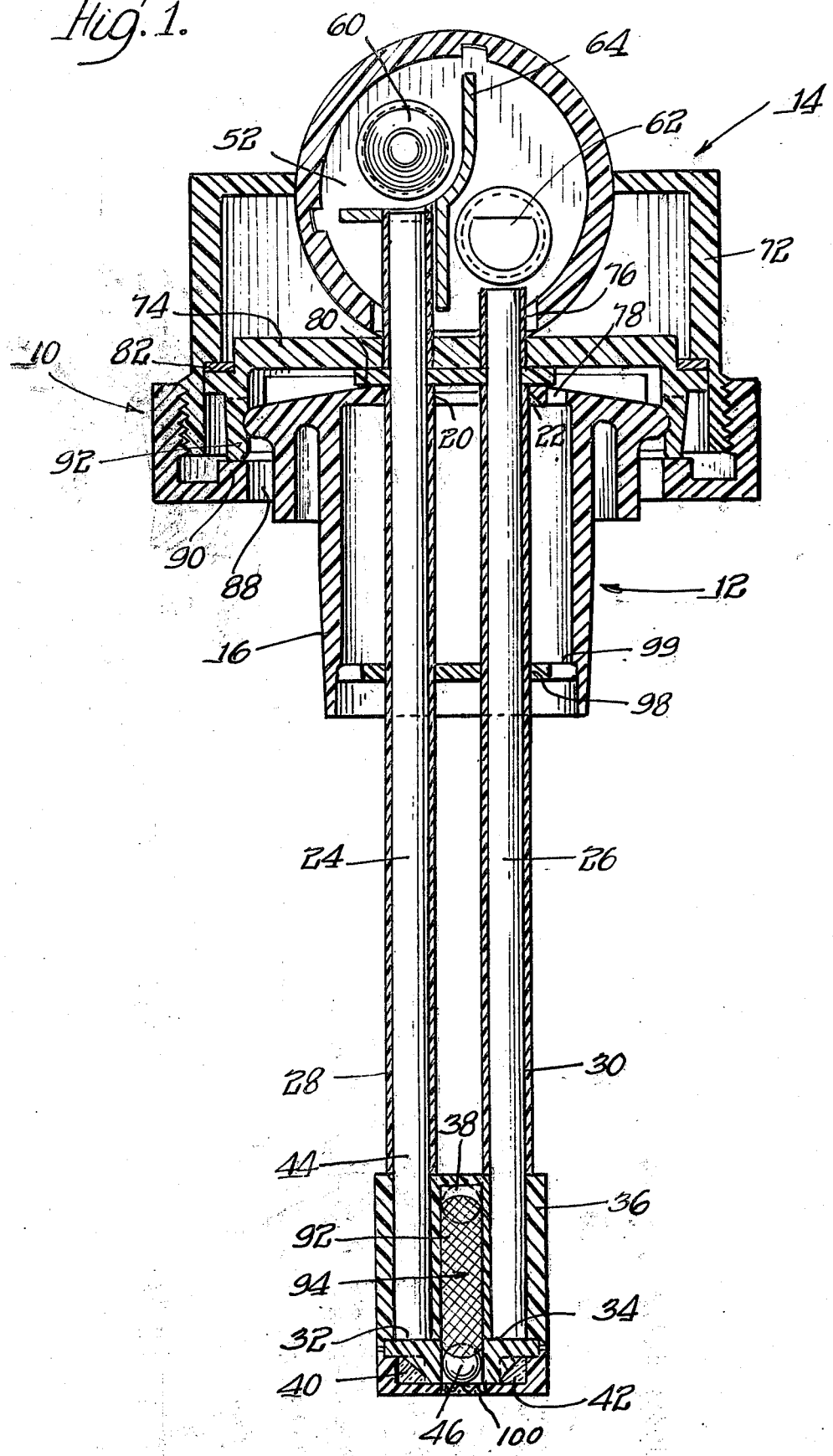
FIG. 1 is a cross-sectional side view of the liquid level indicator of the present invention.

The present invention is particularly suited for measuring the liquid level and the specific gravity of the electrolyte of a storage battery such as those employed in automobiles and trucks and other vehicles, but is not limited to such applications. The indicating portion of the indicator contains a pair of parallel light transmitting pipes which extend into the fill opening down into the battery container. A pair of reflecting prisms are located at the lower end of the light pipes so that light passing down one pipe is reflected from one prism across to the other prism and then up the other light pipe when there is nothing blocking the path of light between the two prisms. In order to measure liquid level and specific gravity, a float ball is maintained in a cage so that when the liquid level is adequate or the gravity is satisfactory, the float ball will be displaced so as to allow light to pass from one prism to the other; and when the liquid level or the specific gravity of the liquid is low, the ball will block off the transmission of light from one prism to the other. Thus, if one of the light pipes receives light from a light source, an indication of the state of the electrolyte may be received from the other light pipe.

In indicators of the type described, the retention of a floating member, such as a ball, in a small channel sometimes results in inaccurate indications when gas bubbles are being released from the electrolyte since these result in displacements of the ball that are not related to liquid level or to the specific gravity of the liquid. It has been found that these inaccuracies can be substantially eliminated by placing a porous filter across open portions of the channel so that gas bubbles do not enter the channel and displace the floating ball.

The indicator described above is also useful for providing signals to a remote indicating unit that may be placed inside a car where it is accessible to the operator. This remote indicating feature is obtained in the described embodiment by providing an upper housing section which is secured to the lower housing indicating section. The upper housing section contains a light bulb which is located above one of the light pipes and a light sensor which is located above the other light pipe with a light shield disposed between the bulb and the sensor. Electrical interconnection wires for the bulb and the sensor are coupled out of the upper housing section to a remote location.

The invention is described in more detail by reference to the drawings in which the liquid indicator 10 is shown as being formed of a lower indicating section 12 and an upper housing section 14. The lower indicating section 12 of the indicator 10 includes a battery cap 16 which is modified so that it has a pair of apertures 20, 22 in the cap. A pair of light transmitting pipes 24, 26 which are preferably constructed of a suitable plastic material and which preferably have a suitable opaque sleeve 28, 30 are inserted through the apertures 20, 22 so they extend downwardly through the fill opening of the battery into the container. The lower surfaces 32, 34 of the light pipes 24, 26 are located in a cage 36 that is secured to the bottom of the light pipes 24, 26.

Figure 2:
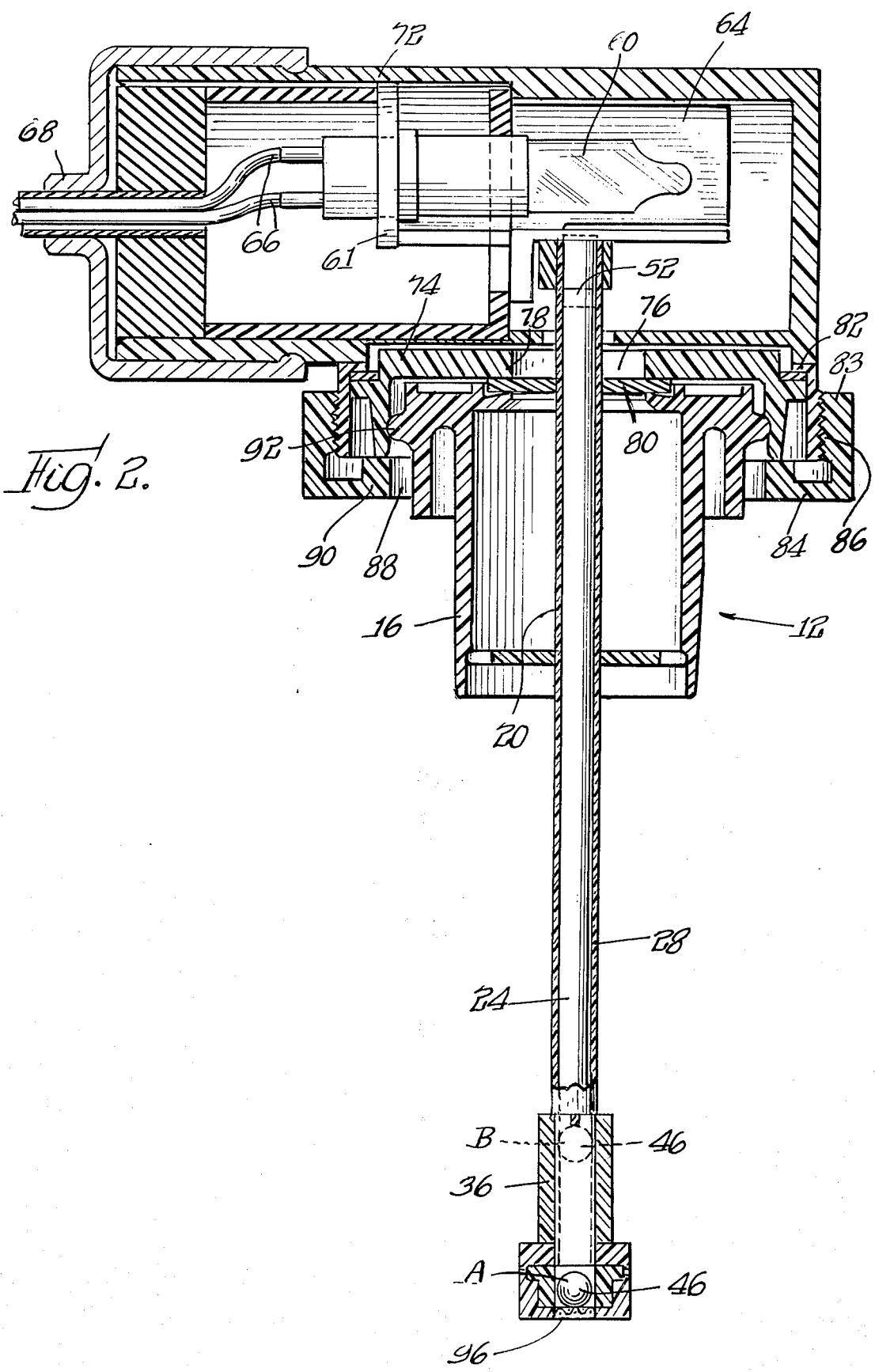
FIG. 2 is a cross-sectional front view of the indicator of FIG. 1.

Disposed below the lower surfaces 32, 34 of the light pipes 24, 26 are a pair of reflecting prisms 40, 42. The prisms 40, 42 are positioned so that a light ray, such as the ray 44, will pass down the light pipe 24 and will be reflected from the prism 40 across to the prism 42 and will then travel up the light pipe 26 when there is no obstruction between the two prisms. A floating sphere or ball 46 of a suitable material, for example silicone rubber, is retained in a channel 38 formed in the cage 36. When the level of the electrolyte is low or when its specific gravity is low, the ball 46 will be in the position A, as shown in FIG. 2; and it will thus block the passage of light from the prism 40 to the prism 42, thereby providing a "dark" indication at the upper surface 48 of the light pipe 26 of a defective battery condition. When the ball 46 is in the dotted position B of FIG. 2, the level of the electrolyte and specific gravity are both satisfactory. Light will thus pass the upper surface 52 of the light pipe 24 down to the prism 40 and then across to the prism 42 and up the light pipe 26 to its upper surface 48. The lower indicating section 12, by itself, thus provides a liquid level and hydrometer indicator which may be used to indicate the level and the specific gravity of a liquid in a container since it may receive ambient light at the upper surface 52 and the condition of the battery could then be viewed at the upper surface 48, or vice versa, if desired.

To provide remote signals to a monitoring station, the light pipes 24, 26 of the indicating section 12 of FIGS. 1 and 2 must be closely associated with a light source and a light sensing element, such as a phototransistor or photodiode or other suitable light sensing element. To achieve this, a light bulb 60 is retained in the upper housing section 14 by a mounting fixture 61 so it lies directly above the upper surface 52 of the light pipe 24 and a light sensor 62 is positioned directly above the upper surface 48 of the light pipe 26. A light shield 64 is positioned between the bulb 60 and the light sensor 62, so as to prevent the direct transmission of light from the bulb 60 to the sensor 62. A rear cap 70 is secured on the forward portion 72 of the housing section 14 and the electrical leads 66 for the light bulb and the light sensor 62 pass through an aperture 68 in the rear cap 70. Thus, electrical energy for the light bulb 60 may be supplied from a remote power source and electrical signals generated by the light sensor 62 may be transmitted to a remote location so that the condition of the battery electrolyte may be continuously monitored.

In order to mount the lower indicating section 12 to the upper housing section 14 to form an indicator unit suitable for remote indication, the battery cap 16 is retained in a collar 74 which has an aperture 76 that receives the light pipes 24, 26. Below the collar 74 is a flange 80 which receives and is fixed to sleeves 28, 30 and postions light pipes 24, 26 relative to the light bulb 60 and the light sensor 62. The cap 16 is vented through the opening 78. The collar member 74 abuts itself aganist an annular shoulder 82 that is formed in the forward housing portion 72. The lower end of the housing section 14 has external threads 83. A cover 84 having an internal thread 86 is threaded onto the external threads 83 of the housing section 14. The cover 84 has an aperture 88 in it which allows the upper portion of the cap 16 to pass through it, and it also has an annular ring section 90 which engages downwardly depending ribs 92 of the collar 74 so as to force the collar 74 against the shoulder 82 when the sections 12 and 14 are secured together to form the indicator unit 10. A baffle member 98 with openings 99 in it is positioned near the lower end of the cap 16.

It has been found that gas bubbles of hydrogen and oxygen, which are emitted by the electrolyte, may displace the ball from its correct position and thereby cause a temporary false indication. This is a problem if the indicator 10 is to be used to supply electrical battery condition signals to a remote location. This problem may be resolved by the use of one or more porous filters, such as the filter 92 which is secured across the vertical side openings 94 of the channel 38, and the porous filter 96 secured into an aperture 100 in the bottom of the cage 36. The porous filters satisfactorily eliminate this problem by precluding the gas bubbles from displacing the float ball 46.

While an embodiment of the present invention has been shown, other variations of the present invention will be apparent to those skilled in the art from the disclosure of the present document. In particular, it is within the scope of the present invention to provide an indicator in which the ball would be initially positioned so as to block light rays when the liquid level is satisfactory and would then drop in the channel down below the reflecting prisms or other reflecting device so as to allow light to pass therebetween when the liquid level on the specific gravity is low. This version thus would change the defective condition indication from a "dark" indication to a "light" indication at the surface 52 of the light pipe 26.

The invention is claimed as follows:

1. A liquid indicator comprising a housing member which is partially open, a light transmitting means, a light receiving means, a float means retained in said housing member so that said float means acts as a shutter between said light transmitting means and said light receiving means in accordance with the level or the specific gravity of the liquid being monitored and porous filter material secured over the open portions of said housing member to preclude gas bubbles that could otherwise effect the position of the float means.

2. A liquid indicator as claimed in claim 1 wherein said housing member comprises a channel, said light transmitting means comprises a light transmitting pipe which leads from a light source and a light reflecting prism located at the bottom of said light transmitting pipe, said light receiving means comprises a light transmitting pipe and a light reflecting prism located at the bottom of said light receiving pipe, and said first and second light reflecting prisms are located so that said float means is disposed intermediate said prisms in said channel so as to act as a shutter for controlling the transmission of light from one prism to the other in accordance with the level or the specific gravity of the liquid being monitored.

3. A liquid indicator as claimed in claim 1 wherein said housing member comprises a channel which retains said float means therein that leads to an opening at the bottom of said housing member and a porous filter material disc is secured across said bottom opening.

4. A liquid indicator as claimed in claim 1 wherein said housing member comprises a channel which retains said float means therein that has elongated vertical side openings and porous filter material is secured across said side openings.

5. A liquid indicator as claimed in claim 4 wherein said channel leads to an opening at the bottom of said housing member and a porous filter material disc is secured across said bottom opening.

6. A liquid indicator as claimed in claim 2 wherein said channel leads to an opening at the bottom of said housing member and a porous filter material disc is secured across said bottom opening.

7. A liquid indicator as claimed in claim 2 wherein said channel has elongated vertical side openings and porous filter material is secured across said side openings.

8. A liquid indicator as claimed in claim 7 wherein said channel leads to a bottom opening and a porous filter material disc is secured across said bottom opening.

* * * * *